United States Patent Office 3,777,029
Patented Dec. 4, 1973

3,777,029
CHEWABLE MULTIVITAMIN TABLETS CONTAINING ALUMINUM NICOTINATE
Louis Magid, Clifton, N. J., assignor to Hoffmann-La Roche Inc., Nutley, N.J.
No Drawing. Continuation of abandoned application Ser. No. 704,254, Feb. 9, 1968. This application Jan. 28, 1971, Ser. No. 110,648
Int. Cl. A61k 15/12
U.S. Cl. 424—266          4 Claims

ABSTRACT OF THE DISCLOSURE

Chewable multivitamin tablets containing aluminum nicotinate.

RELATED APPLICATION

This application is a continuation of copending U.S. application, Ser. No. 704,254, filed Feb. 9, 1968 by Magid, now abandoned.

BACKGROUND OF THE INVENTION

Niacin, also known as nicotinic acid, is a well-known vitamin compound which has proved to be of great value in therapeutics and is recognized as the antipellagra factor. It has been used mostly as an additive to food, e.g., bread. Recently there has been interest in multivitamin chewable tablets containing niacin-active materials. However, niacin, when taken orally, even as little as 20 mgs., causes disagreeable side reactions such as flushing, pruritis, uriticaria, dryness of the skin and blurring of vision. Niacinamide has been used in place of niacin since it does not cause the side effects caused by niacin; however, niacinamide is unsatisfactory for use in chewable multivitamin tablets since it has a bitter taste and undesirable solubility characteristics. In efforts to overcome these problems, coated niacinamide granules have been utilized; however, this approach is uneconomical. Thus, there is a need for a niacin-active material in a form suitable for incorporation into chewable multivitamin tablets which is economical and does not cause undesirable side effects or taste.

SUMMARY OF THE INVENTION

This invention relates to novel chewable multivitamin tablet compositions containing as the niacin-active component, aluminum nicotinate.

DETAILED DESCRIPTION OF THE INVENTION

It has been discovered that aluminum nicotinate, because of its low solubility and innocuous taste and more freedom from side reactions generally encountered with niacin, is eminently suitable for use in chewable multivitamin tablets.

Aluminum nicotinate is prepared by adding a slurry of aluminum hydroxide to nicotinic acid dissolved in hot water causing the product to precipitate after which it is recovered by filtration and drying. The product, a white amorphous powder, is commercially available as the dinicotinate from J. T. Baker Chemical Co.

As noted above, the use of aluminum nicotinate in chewable, multivitamin tablet formualtions is preferable for, inter alia, its more pleasant taste. Comparison tests, using an adult taste panel, with multivitamin tablets formulations containing niacinamide or aluminum nicotinate as the respective sources of nicotinic acid have shown a wide preference for the aluminum nicotinate-containing tablets.

The chewable multivitamin tablets are formed by means well known in the art, i.e., using conventional excipients and lubricants, forming a granulation of the ingredients and compressing in an automatic tabletting machine. The amount of aluminum nicotinate present in the vitamin tablet is variable. However, there is usually present sufficient amounts to provide at least about the minimum required amount of niacin activity, e.g., from about 0.8% to about 5.0% by weight based on total weight (i.e. about 4–25 mg. per tablet of 500 mg.). This is equivalent to an aluminum nicotinate concentration from about 0.9% to about 6.0% by weight based on total weight (i.e. from about 4.7–29.4 mg. of aluminum nicotinate per tablet of 500 mg.).

The following examples illustrates the invention which is not intended to be limited thereto. All temperatures are in ° C.

Example 1

This example illustrates a typical chewable multivitamin composition containing aluminum nicotinate as the nicotinic acid source. The following ingredients are used:

| Ingredients: | Parts by weight |
|---|---|
| Mannitol | 240 |
| Sodium sucaryl (sodium cyclamate) | 10 |
| Soluble saccharin | 0.8 |
| Sodium ascorbate | 37.4 |
| Ascorbic acid | 42.1 |
| Polyvinyl pyrrolidone (20% sol'n isopropanol) | 10 |
| Isopropanol | 59 |
| Vitamin A acetate powder with Vitamin $D_2$ (500 units of A/50 units $D_2$) | 12.5 |
| Rocoat [1] thiamine mononitrate—33⅓% | 9.9 |
| Rocoat [1] vitamin $B_2$—33⅓% | 8.25 |
| Aluminum nicotinate | 25.90 |
| Rocoat [1] vitamin $B_6$·HCl | 3.30 |
| Vitamin $B_{12}$ gelatin coated 0.1% | 1.25 |
| Cherry flavor | 5 |
| Talc | 5 |
| Stearic acid | 5 |
| Magnesium stearate | 5 |

[1] Rocoat—a mixture consisting essentially of mono and diglycerides of stearic and palmitic acids.

The mannitol, sodium sucaryl, saccharin, sodium ascorbate, ascorbic acid and PVP are mixed together and granulated with isopropanol. The granules are dried at 45° and ground to 14 mesh on a U.S. Sieve. The remaining ingredients are mixed together, added to the granulation and compressed on 7/16" standard concave punches at 465 mg. The resulting tablets are firm, hard and have a taste suitable for use as a chewable tablet.

Example 2

This example illustrates the preferential taste appeal of chewable, multivitamin compositions containing aluminum nicotinate.

Chewable, multivitamin formulations containing the following ingredients are prepared:

| Ingredients | Formulation parts (by weight) | |
|---|---|---|
| | 2A | 2B |
| d-Biotin | 0.04 | 0.04 |
| Rocoat thiamine mononitrate, 33⅓% | 4.45 | 4.45 |
| Rocoat pyridoxin HCl, 33⅓% | 3.96 | 3.96 |
| Rocoat riboflavin, 33⅓% | 4.95 | 4.95 |
| Stabicote vitamin $B_{12}$, 1% | 0.336 | 0.336 |
| Vitamin E acetate, 33% powder | 7.27 | 7.27 |
| Calcium pantothenate | 11.2 | 11.2 |
| Vitamin A acetate (5,000 U.S.P. units) | 17.0 | 17.0 |
| Vitamin $D_2$ | 0.54 | 0.54 |
| Aluminum nicotinate | 12.94 | |
| Rocoat niacinamide, 33⅓% | | 33.0 |
| Ascorbic acid, 90% granulation | 40.0 | 40.0 |
| Sodium ascorbate, 95% granulation | 35.5 | 35.5 |
| Sodium chloride | 0.8 | 0.8 |
| Magnesium stearate | 2.5 | 2.5 |
| Stearic acid | 2.5 | 2.5 |
| Modified sucrose (Di-Pac 379) | 288.0 | 288.0 |
| Mannitol | 60.0 | 60.0 |
| Cherry flavor | 8.0 | 8.0 |

The quantities of both the aluminum nicotinate and Rocoat niacinamide are equivalent to 11 parts of niacinamide. Neither composition contains saccharin. Di-Pac 379 (American Sugar) is prepared by coprecipitation of sucrose with dextrins. Stabicote (Merck) is a gelatin encapsulated vitamin $B_{12}$.

The mannitol, modified sucrose, ascorbic acid granules, sodium ascorbate granules, stearic acid, sodium chloride and magnesium stearate are mixed together followed by admixture of the remaining ingredients therewith. This mixture is then compressed on $7/16''$ standard concave punches at 500–520 mg. The resulting tablets are firm and hard and suitable for use as chewable tablets.

A taste panel consisting of 18 adults is selected for comparative evaluation of the tableted compositions. To eliminate any bias resulting from the order of tasting each tablet is tasted first by one-half of the panel.

66.7% of the panel expressed a preference, on the basis of taste acceptability, for the aluminum nicotinate-containing tablet while only 22.2% expressed a preference for the Rocoat nacinamide-containing tablet. 11.1% of the taste panel expressed no preference. The order of taste testing did not affect the preferences.

Example 3

This example illustrates the use of aluminum nicotinate in chewable, multivitamin chocolate tablets. The following ingredients are used:

| Ingredients | Formulation (parts by weight) | |
|---|---|---|
| | 3A | 3B |
| d-Biotin | 0.046 | 0.046 |
| Thiamine mononitrate | 1.38 | 1.38 |
| Stabicote vitamin $B_{12}$, 1% | 0.345 | 0.345 |
| Aluminum nicotinate | 13.53 | 13.53 |
| Sodium ascorbate, fine powder | 75.6 | 75.6 |
| Pyridoxine HCl | 1.38 | 1.38 |
| Saccharin, insoluble | 0.44 | 0.44 |
| Saccharin, sodium | 0.28 | 0.28 |
| Riboflavin | 1.725 | 1.725 |
| Calcium pantothenate | 11.5 | 11.5 |
| Ferrous fumarate, 32.3% iron | | 34.6 |
| Vitamin A palmitate (5,000 U.S.P. units) | 4.4 | 4.4 |
| Vitamin $D_2$ (400 U.S.P. units) | 0.012 | 0.012 |
| dl-alpha-tocopherol acetate | 2.3 | 2.3 |
| Butylated hydroxytoluene | 0.035 | 0.035 |
| Imitation flavor enhancer | 0.75 | 0.75 |
| Imitation flavor, vanilla custard | 0.75 | 0.75 |
| Chocolate, q.s. | 715.0 | 715.0 |

The ferrous fumarate as recived analyzes at 32.3% iron. The amount of aluminum nicotinate added is equivalent to 11.5 parts of niacinamide.

The dry ingredients are admixed and added to the chocolate. The liquid vitamins are then added and the vitamin-containing chocolate is tempered (i.e., maintained at a temperature (83–84° F.) just above crystallization until equilibrium is reached and then heated to 91–92° F.) and poured or dropped into molds.

If desired, a continuous, hard coating can be applied over the set chocolate shapes using a standard sugar coating solution and either pan or film techniques.

In chocolate-containing chewable, multivitamin formulations, the need to add vitamins in their coated form, with the exception of nicotinic acid, is obviated by the masking effect of the chocolate. Since aluminum nicotinate has a sweet, slightly tart taste in comparison to the harshly bitter taste of niacinamide, chocolate formulations containing aluminum nicotinate are much better tasting.

I claim:

1. A chewable multivitamin tablet premix composition containing as the niacine-active ingredient an effective amount of from about 0.9% to about 6.0% by weight based on the weight of the composition of aluminum nicotinate.

2. A chewable multivitamin tablet containing as the niacinactive ingredient an effective amounts of from about 0.9% to about 6.0% by weight of aluminum nicotinate based on the weight of the tablet.

3. A chocolate, chewable multivitamin tablet containing as the niacin-active ingredient an effective amount of from about 0.9% to about 6.0% by weight of aluminum nicotinate based on the weight of the tablet.

4. A method of improving the taste of chewable multivitamin tablets which comprises adding thereto as the niacin-active ingredients, an effective amount of from about 0.9% to about 6.0% by weight of aluminum nicotinate based on the weight of the tablet.

References Cited

UNITED STATES PATENTS 2,970,082   1/1961   Miale _____ 424—266

OTHER REFERENCES

Atlas Chem. Industries Bulletin (Pharm.), Gran. form of Mannitol, N.F., 1966.

ALBERT T. MEYERS, Primary Examiner

V. D. TURNER, Assistant Examiner